May 30, 1944.　　　　C. G. STRANDLUND　　　　2,349,997
HITCH DEVICE
Filed Sept. 24, 1941　　　　2 Sheets-Sheet 2
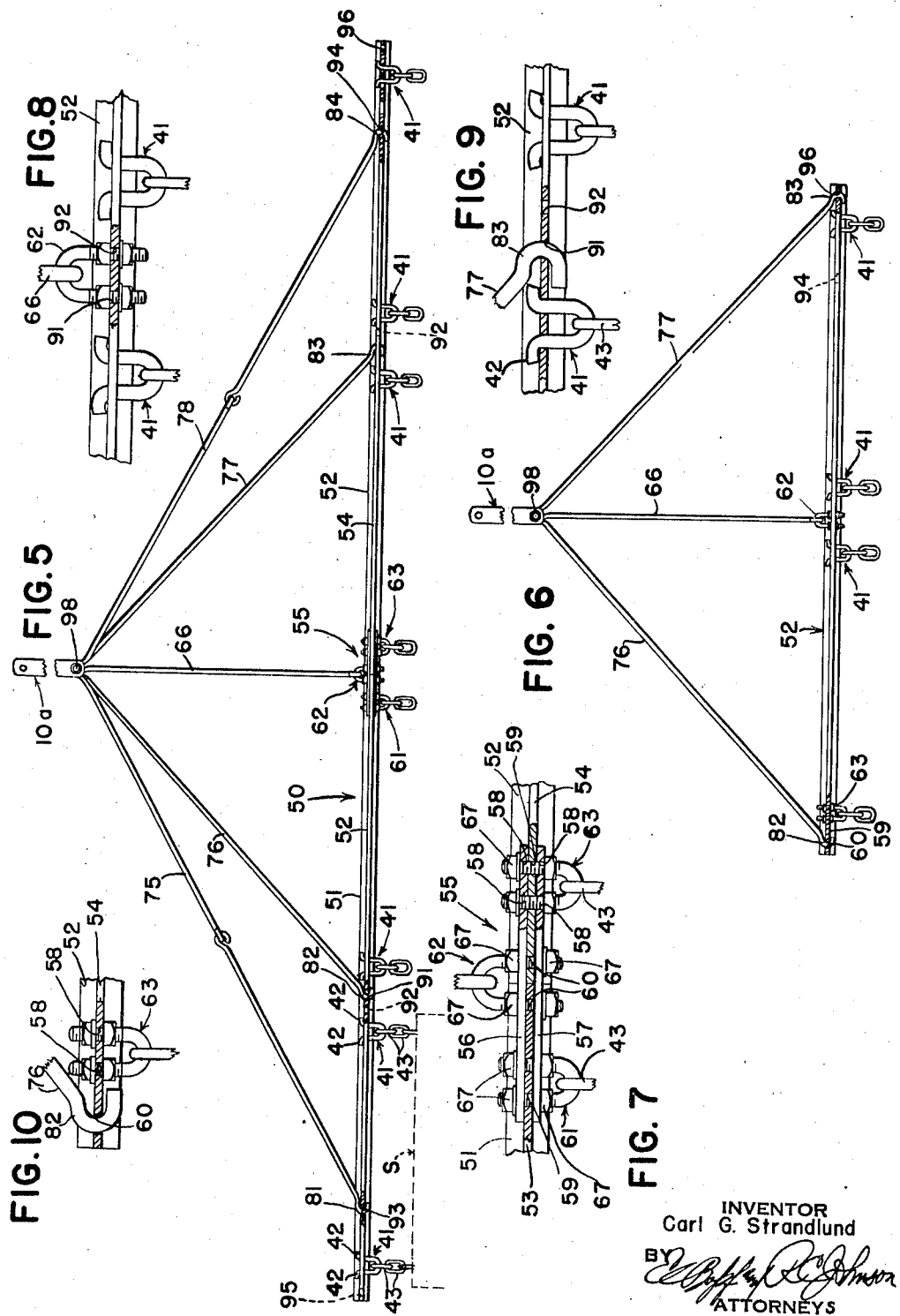
INVENTOR
Carl G. Strandlund
BY
ATTORNEYS Patented May 30, 1944

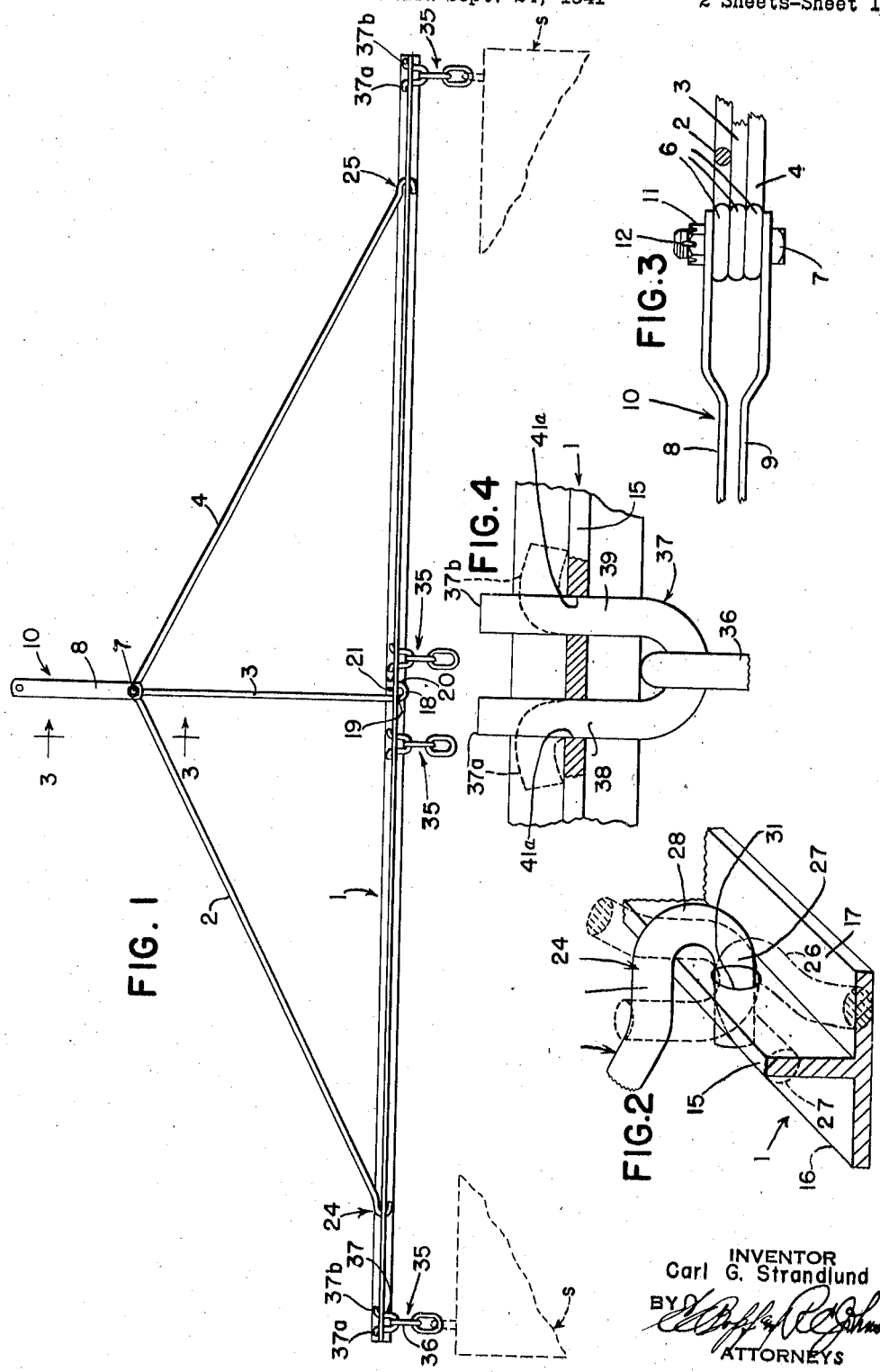

2,349,997

UNITED STATES PATENT OFFICE 2,349,997

HITCH DEVICE

Carl G. Strandlund, Moline, Ill., assignor to Deere & Company, Moline, Ill., a corporation of Illinois Application September 24, 1941, Serial No. 412,135

7 Claims. (Cl. 55—84)

The present invention relates generally to agricultural implements and more particularly to evener bars for use with multi-section harrows.

The object and general nature of the present invention is the provision of a simple inexpensive evener the parts of which are so constructed that they are not likely to come apart or become disengaged in operation. Heretofore, where eveners have included parts bolted together, considerable difficulty and annoyance have been experienced due to the bolts and similar fastenings becoming loosened during service and allowing parts to become disconnected. In one form of the present invention, I provide a simple and sturdy evener in which only one bolt is used throughout the entire evener. More specifically, it is a feature of this invention to provide an evener made up of a transverse evener bar and draft links, the evener bar having apertures in the web thereof and the draft links having hook-like ends which are particularly formed so that when once engaged in apertures in the evener bar and then bolted together at their forward or converging ends, the draft links are securely connected to the evener bar without the use of bolts or other extraneous means. Another feature of the present invention is the provision of similar means effecting a connection between the harrow section draft links and the evener bar, which connection once established is permanent and lasts substantially the life of the harrow.

Another important feature of the present invention is the provision of an evener of the convertible type, in which the above-mentioned features are incorporated. Further, it is a feature of this invention to provide an evener which is made up of two aligned evener bars connected together by means including U-bolts, with the consequent advantage that U-bolts are not likely to loosen during service as are conventional bolts in which when the nut becomes slightly loose, both the bolt and the nut may turn, whereas with U-bolts, the bolt itself is not permitted to turn in the openings in the parts which it secures.

These and other objects and advantages of the present invention will be apparent to those skilled in the art after a consideration of the following detailed description, taken in conjunction with the accompanying drawings in which the preferred forms of the present invention have been shown.

In the drawings:

Figure 1 is a plan view of an evener for a two-section harrow, in which only one fastening bolt has been used;

Figure 2 illustrates the manner of engaging the draft links with the evener bar;

Figure 3 is a fragmentary side view, taken generally along the line 3—3 of Figure 1, showing the bolt means securing the forward ends of the draft links to the hitch member associated therewith;

Figure 4 illustrates the manner in which the U-shaped members, connecting the harrow section draft links with the evener bar, are connected to the evener bar;

Figure 5 is a plan view of a four-section harrow evener;

Figure 6 is a view of parts of the harrow shown in Figure 5, reduced to a two-section harrow evener;

Figure 7 is an enlarged fragmentary view, showing the fastening means securing the adjacent inner ends of the aligned evener bars of the evener shown in Figure 5;

Figure 8 is a fragmentary view of the central section of the harrow shown in Figure 6, in which the evener bar comprises one of the two bars of the evener shown in Figure 5;

Figure 9 is an enlarged fragmentary view showing the connection of the intermediate draft link to the central portion of one of the two evener bars employed in the evener shown in Figure 5; and Figure 10 is a fragmentary view showing the manner of connecting one of the diagonal draft links to the evener bar in the evener shown in Figure 6.

Referring now to the drawings, more particularly Figures 1–4, the evener shown comprises a one-piece evener bar 1 and three draft links 2, 3 and 4, the draft links 2 and 4 preferably being identical. The forward ends of each of these draft links is formed with an eye 6 which may be placed in registry, as in Figure 3, to receive a bolt 7 which secures the two straps 8 and 9 making up the hitch member 10 to the front ends of the draft links 2, 3 and 4. A castellated nut 11 is screwed onto the bolt 7 and held against accidental displacement by a cotter 12.

As best shown in Figures 1 and 2, the evener bar 1 is preferably of T-section having a vertical web 15 and front and rear flanges 16 and 17. The web flange 15 is apertured at a plurality of points to receive the rear ends of the links 2, 3 and 4 and the associated draft connections with the harrow sections. Centrally, the evener bar 1 is provided with three pairs of openings, the center pair receiving the U-shaped hook end 18 of the center link 3. As will be seen from Figure 1, the hook end 18 at the rear end of the draft link 3 includes generally parallel side portions 19 and 20, the latter terminating in a forwardly directed end which is formed with an opening therein to receive a cotter or other fastening means 21.

The rear ends of the other draft links 2 and 4, which preferably are identical, are also formed with hook-like portions indicated at 24 and 25. As best shown in Figure 2, the hook end 24 is formed as a substantially U-shaped section having parallel side portions 26 and 27 connected by a curved or bight portion 28. The side portions 26 and 27 of the hook 24 are parallel and are disposed at an angle to the main body of the draft link 2, the angle corresponding to the angle which the draft link normally makes with the evener bar 1. The outer end portions of the evener bar 1 are apertured, as at 31 (Figure 2), to receive the hook ends of the links 2 and 4.

The manner of inserting the hook ends 24 and 25 of the diagonal draft links 2 and 4 is best shown in Figure 2. The draft links 2 and 4 are connected with the evener bar 1 before the forward ends of the links are connected by the bolt 7. As best shown in Figure 2, when inserting the hook end 24 of the link 2, the latter is placed generally across the evener bar 1 and the free end of the side portion 27 is passed through the opening 31 of the T-bar 1. After engaging the end of the side portion 27 in the opening 31, the link 2 is moved forwardly therein a distance sufficient to permit the link 2 being swung upwardly in the opening 31 to substantially a vertical position, as shown by the broken line position in Figure 2. After being swung upwardly to a vertical position, the draft link 2 can then be swung generally about a longitudinal axis down into a horizontal position, indicated by the dot and dash lines in Figure 2, with the side portions 26 and 27 of the hook end 24 lying on opposite sides of the central web 15 of the evener bar 1. The other diagonal draft link 4 is connected with the evener bar 1 in the same manner. The hook end 18 at the rear end of the central draft link 3 is inserted by first passing the free end or side 21 of the hook rearwardly through the left hand opening (Figure 1) of the center pair of openings in the evener bar 1. This is followed by passing the curved portion of the hook section 18 and finally the other side portion 19 of the hook section 18 into the left hand opening. The draft link 3 may then be shifted rearwardly beyond the position shown in Figure 1, and rotated about its longitudinal axis so as to place the side portion 20 of the hook section 18 in a position to enter the other opening of the central pair of openings in the intermediate portion of the evener bar 1. The draft link 3 is then shifted forwardly to bring the side section 20 of the hook 18 into the corresponding opening in the central portion of the evener bar 1, after which the cotter 21 can be inserted. After the draft links 2, 3 and 4 have been connected as described above, the bolt 7 is inserted through the eyes 6, connecting the straps 8 and 9 thereto and, in addition, connecting the forward portions of the draft links so that, as particularly regards the diagonal draft links 2 and 4, they cannot become disconnected from the evener bar 1.

The connections by which the harrow sections S are connected with the evener bar 1 are preferably all identical, as shown in Figure 1, and hence a description of one will suffice. Referring now to Figures 1 and 4, each harrow section connection is indicated by the reference numeral 35, and each includes one or more links 36, the forward one of which is connected to a U-shaped member 37 (Figure 4), the side portions 38 and 39 of which are inserted through openings 41a in the web 15 of the evener bar 1. The U-shaped member 37 (Figure 4) during manufacture is sent to the assembly line in the form shown in full lines in Figure 4. The assembly man inserts the side portions 38 and 39 through the openings 41a and then by any suitable means bends the ends 37a and 37b laterally outwardly into the position shown in broken lines in Figure 4. This forms a permanent connection between the links 36 and the evener bar 1, a connection which ordinarily will last the lifetime of the evener. However, if excessive wear occurs and the sections 37a and 37b are sheared off, it would be a simple matter for the farmer to replace the broken part with one of the unbent members 37, inserting the side portions 38 and 39 through the openings 41, and then bending the ends 37a and 37b over with a hammer or other tool.

Referring now to the modified form of the invention shown in Figures 5–10, it will be seen that the evener shown in Figure 5 is adapted to receive four harrow sections S, as shown in dotted lines. The connecting means between each harrow section and the evener bar is substantially the same as the connecting means described above, embodying a U-shaped member 41 having ends 42 inserted through openings in the evener bar and then bent over, together with one or more links 43 connecting the member 41 to the associated harrow section S.

The evener bar for the evener shown in Figure 5 is indicated in its entirety by the reference numeral 50 and is made up of two T-shaped bars 51 and 52 secured together in aligned relation by a connecting structure indicated in its entirety by the reference numeral 55 in Figure 5. This connecting structure, as best shown in Figure 7, comprises a pair of plates 56 and 57 apertured, as at 58, to receive three U-bolts 61, 62 and 63. The adjacent ends of the webs 53 and 54 of the T-bars 51 and 52 are also apertured, as at 59 and 60, also for the purpose of receiving the U-bolts 61, 62 and 63. The U-bolts 61 and 63 receive the forward link 43 of the associated harrow section connection, and the center U-bolt 62, the ends of which connect to the adjacent ends of both of the T-bar sections 51 and 52, receives the rear end of a center draft link 66, the rear end preferably being in the form of an eye. Nuts 67 are threaded onto the end of the U-bolts 61, 62 and 63 and are provided with lock washers and serve to clamp the plates 56 and 57 in position on opposite sides of the web sections 53 and 54 of the evener bars 51 and 52.

The four-section harrow evener shown in Figure 5 is provided with five draft links, one of which is indicated at 66. The other links extend diagonally rearwardly and are indicated by the reference numerals 75, 76, 77 and 78. The laterally outer links 75 and 78 are jointed or articulated and both the inner diagonal links 76 and 77 and the laterally outer diagonal links 75 and 78 are provided at their rear ends with hook-like sections 81, 82, 83 and 84, these sections being preferably identical with one another and with the hook section 24 shown in Figure 2. The vertical web of each of the evener bars 51 and 52 is provided with a pair of apertures 91 and 92 (Figure 9) generally in the central portion of the evener bar, as best shown in Figure 5. The hook ends 82 and 83 of the intermediate diagonal draft links 76 and 77 are disposed in one opening of each of the two pairs of central openings 91 and 92. The hook ends 81 and 84 of the laterally outer draft links 75 and 78 are engaged in openings 93 and 94 formed in the outer end portion of the two evener bars 51 and 52. The outermost ends of the evener bars 51 and 52 are formed with additional openings 95 and 96 for a purpose which will appear later. The forward ends of all of the draft links 66, 75, 76, 77 and 78 are formed with eyes to receive a hitch member 10a, substantially the same as the hitch member 10 shown in Figure 1. The bolt which secures the ends of the draft links 66, 75, 76, 77 and 78 together is indicated by the reference numeral 98 in Figure 5.

The evener shown in Figure 5 is, as mentioned above, adapted to be connected to four harrow sections, but an evener of this type is adapted to be reduced to form an evener adapted to receive two sections, and in order to do this, the connection 55 is dismantled and one of the evener bars, such as the evener bar 52, is used with the three draft links 66, 76 and 77 and the associated hitch member 10a. Referring to Figure 6, this figure shows the manner in which the parts just mentioned are assembled to form an evener for two harrow sections. As best shown in Figure 6, the end 83 of the draft link 77 is removed from the opening 91 (Figure 9) and inserted in the opening 96 (Figure 6). Also, the hook end 82 of the link 76 is removed from the opening 91 in the left hand evener bar 51 and inserted in the opening 60 (Figure 7) in the left end of the evener bar 52. The U-bolt 62 at the rear end of the center draft link 66 is inserted through the openings 91 and 92 (Figure 9) in the central portion of the evener bar 52, between the two U-shaped connectors 41 of the associated harrow section connections. Then the bolt 98 is connected to the eyes at the forward ends of the draft links 66, 76 and 77 and the hitch member 10a connected thereto. Thus, without the provision of any other parts, I am enabled to provide a two-section evener by using parts of the four-section evener shown in Figure 5, the only addition required being additional openings in the web of at least one of the evener bars 51 and 52.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An evener bar for harrows and the like, comprising a main evener bar having a generally vertical web with apertures therein adjacent one edge thereof, and a pair of forwardly converging draft links connected together at their forward ends and having hook portions at their rear ends, each of said hook portions being normally disposed in a generally horizontal plane and including a pair of straight parallel sections spaced apart a distance substantially equal to the thickness of said vertical web and a curved section joining said parallel sections, the openings in the web being spaced from the edge thereof a distance no greater than the distance between said spaced apart parallel sections, whereby by shifting said links forwardly and then upwardly and laterally inwardly, the side portions of said hook portions may be brought down in close fitting relation on opposite sides of said web and said draft links connected together at their forward ends so as to prevent disengagement of said hook portions from said evener bar.

2. An evener for multi-section harrows and the like, comprising a main evener bar having a pair of apertures in the central portion thereof and apertures adjacent the ends, a plurality of draft links connected together at their forward ends, one of said draft links extending substantially directly rearwardly and having a U-shaped hook portion at its rear end with the sides of said hook portion disposed in the pair of apertures in the central portion of said evener bar, the other draft links diverging rearwardly and having their rear ends formed with U-shaped hook portions disposed generally at an angle to the main body of the links, respectively, said latter U-shaped hook portions being engaged in the apertures adjacent the ends of said evener bar and generally parallel to the web thereof, and means preventing rearward displacement of said center link relative to said evener bar, the parallel portions of said laterally outer U-shaped hook portions serving to prevent displacement of said links by engagement with the sides of the web of said evener bar.

3. An evener for a pair of harrow sections, comprising a one-piece evener bar of substantially T-section with the web thereof disposed generally vertically and provided with a plurality of apertures therein, three draft links extending forwardly in generally convergent relation, a hitch member to which the forward ends of said draft links are connected, the center draft link having a hook-like end at its rear disposed in openings in the central portion of said evener bar, the side portions of said hook-like end extending generally forwardly, the rear ends of the other links being formed with substantially U-shaped hook-like portions and disposed in openings adjacent the laterally outer ends of said evener bar with the side portions of said hook-like ends extending generally transversely on opposite sides of the web of said evener bar, whereby the rear ends of said last mentioned links remain engaged with said evener bar so long as the forward ends thereof are connected together, a pair of harrow section receiving connections associated with the central portion of said evener bar and including a pair of U-shaped members having their forward ends extending forwardly through openings in the central portion of said evener bar and bent laterally, and a second harrow receiving connection associated with each of the outer ends of said evener bar, including a generally U-shaped member having its ends extending forwardly through openings in the evener bar and bent laterally to retain the same in place in said evener bar.

4. An evener convertible from a four-section evener to a two-section evener, comprising a pair of evener bars, means connecting the adjacent ends of said evener bars together to form an evener bar having a length sufficient to span four harrow sections, the adjacent ends of said evener bars being apertured, a draft link structure for said evener bars, including a center draft link and means securing the same to the central portion of said aligned evener bars, said means including attaching means passing through said openings in the adjacent ends of said evener bars, said link structure also including two pairs of rearwardly divergent links connected at their forward ends with said center link, the two inner divergent links having hook-like ends adapted to engage in openings generally in the central portion of each of said aligned evener bars, the laterally outer end of at least one of said evener bars having an aperture therein spaced from the outer end of the bar substantially the same distance as the opening in the other end of said bar, the means connecting said evener bars in alignment and the means connecting the rear end of the center link to the aligned bars being removable and the rear hook ends of the inner divergent links being disposable in the openings, respectively, in the end portions of said one evener bar.

5. An evener for harrows and the like, comprising a main evener bar having an aperture at each end, the axis of each aperture extending in a generally fore and aft direction, and a pair of rearwardly diverging draft links connected together at their forward ends and disposed in a generally horizontal plane, said draft links having their rear ends formed with hook portions disposed in said horizontal plane and generally at an angle to the main body of the links, respectively, and engaged with said bar, said latter hook portions each including parallel sections disposed, respectively, on opposite sides of said evener bar and spaced apart in a fore and aft direction a distance substantially equal to the thickness of the portion of the bar embraced thereby.

6. An evener convertible from a four-section evener to a two-section evener, comprising a pair of evener bars, means connecting the adjacent ends of said evener bars together to form an evener bar having a length sufficient to span four harrow sections or the like, a draft link structure for said evener bars, including a center draft link and means securing the same to the central portion of said aligned evener bars, said link structure also including two pairs of rearwardly divergent links connected at their forward ends with said center link, means releasably connecting the outer links to the outer ends of evener bars and means optionally connecting the rear ends of the laterally inner of said divergent links to the middle portions of said evener bars, respectively, or to the end portions of one of said evener bars, the means connecting the rear end of the center link to the aligned bars being removable therefrom and attachable to the center portion of said one evener bar, whereby to form an evener to receive two harrow sections or the like.

7. An evener for harrows and the like, comprising a main evener bar having an aperture at each end, the axis of each aperture extending in a generally fore and aft direction, and a pair of rearwardly diverging draft links normally connected together at their forward ends and disposed in a generally horizontal plane when in draft-transmitting position, each of said draft links having its rear end formed with hook portions disposed generally at an angle to the main body of the link and engaged with said bar, said hook portions each including sections disposed, respectively, on opposite sides of said evener bar and spaced apart in a fore and aft direction a distance substantially equal to the thickness of the portion of the bar embraced thereby, each of the apertures in said bar being spaced from an edge thereof a distance substantially no greater than the spacing between said hook portions, whereby by first inserting the outer portion of said hook portions of one of said links through one of said apertures and then swinging the link laterally and downwardly into its normal draft-transmitting position, said hook portions are brought into substantially close fitting relation on opposite sides of the engaged portion of said evener bar and, when both of said links are fastened together in their normal draft-transmitting position, said hook portions are thereby prevented from disengaging from said evener bar by either fore and aft or lateral movement.

CARL G. STRANDLUND.